United States Patent [19]

Nakayama et al.

[11] 4,435,531

[45] Mar. 6, 1984

[54] EMULSION COMPOSITION CONTAINING CELLULOSE DERIVATIVE

[75] Inventors: Yasuharu Nakayama; Kenji Yamamoto; Toshiki Komatsuzawa; Hajime Sukejima; Kazuo Nomoto, all of Hiratsuka, Japan

[73] Assignee: Kansai Paint Co., Ltd., Hyogo, Japan

[21] Appl. No.: 404,053

[22] Filed: Aug. 2, 1982

[30] Foreign Application Priority Data

Aug. 4, 1981 [JP] Japan ............................... 56-121360

[51] Int. Cl.$^3$ ............................................... C08L 1/10
[52] U.S. Cl. ......................................... 524/37; 524/38; 524/39; 524/41; 524/42; 524/43; 524/44; 524/502; 524/504; 524/539; 525/54.21; 525/54.3; 527/311; 527/312; 527/313; 527/314
[58] Field of Search .................. 524/502, 504, 539; 525/54.21, 54.3; 526/238.2, 238.21; 527/311, 312, 313, 314, 315

[56] References Cited

U.S. PATENT DOCUMENTS 3,953,386  4/1976  Murphy et al. .................... 524/716
4,352,902 10/1982  Nakayama et al. .................. 524/40

Primary Examiner—John Kight, III
Assistant Examiner—Nathan M. Nutter
Attorney, Agent, or Firm—Wenderoth, Lind & Ponack

[57] ABSTRACT

A cellulose derivative-containing emulsion composition which is the product of emulsion polymerization of at least one ethylenically unsaturated monomer in the presence of a water-solubilized product of a cellulose derivative-modified vinyl copolymer having an acid value of from about 3 to about 150, said vinyl copolymer being obtained by copolymerizing a cellulose derivative with an ethylenically unsaturated monomeric component composed of an ethylenically unsaturated acid and another ethylenically unsaturated monomer.

22 Claims, No Drawings

EMULSION COMPOSITION CONTAINING CELLULOSE DERIVATIVE

This invention relates to a novel emulsion composition containing a cellulose derivative. More specifically, the invention relates to an emulsion composition containing a cellulose derivative which has good stability and when coated on a substrate, gives a coated film having excellent transparency and surface gloss and other good properties such as high hardness, water resistance and solvent resistance.

Since a coated film composed of a cellulose derivative has high hardness, a smooth good feel, and other excellent properties such as polishability and gasoline resistance, coating compositions comprising a cellulose derivative in admixture with a paint resin such as an acrylic or alkyd resin have been widely used as household and wood-processing lacquers or as automotive repairing paints. However, these mixed paints cannot meet the recent social demand for resource saving and pollution control because they generally require a large amount of solvent in order to obtain a coatable viscosity.

Attempts have therefore been made previously to introduce a cellulose derivative having the aforesaid properties into paints of the aqueous emulsion type which are resource-saving and pollution-free. For example, Japanese Laid-Open Patent Publication No. 28188/1976 which is a counterpart of U.S. patent application Ser. No. 485,271 filed July 2, 1974 (now U.S. Pat. No. 3,953,386) discloses that an aqueous emulsion composition is prepared by mixing at least one monomer with water, a surface-active agent and at least one polymer (a cellulose derivative is cited as one example of the polymer) to form an aqueous dispersion of polymer-monomer particles, and then radical-polymerizing the monomer in the particles. When a cellulose derivative is used as the polymer in this method, the emulsification of the cellulose derivative-monomer before polymerization must be effected until the polymer-monomer particles have an average particle diameter of 0.01 to 5μ. This requires a relatively large amount of a surface-active substance, and a coated film formed from the resulting emulsion composition containing a large amount of the surface-active substance naturally has poor water resistance. Furthermore, the introduction of a cellulose derivative increases the glass transition temperature (Tg) of the resulting polymer, and the resulting emulsion composition is frequently useless as a coating composition in the absence of a film-forming aid. If the film-forming aid to be added is water-soluble and it is used in a large amount, the resulting emulsion system becomes unstable. On the other hand, the use of a large amount of a water-insoluble film-forming aid would render the emulsion composition flammable.

As a remedy for the above-mentioned defect, Y. Nakayama et al. previously proposed a method for introducing a cellulose derivative into an emulsion composition, which comprises emulsion-polymerizing a mixture of at least one radical-polymerizable unsaturated monomer and at least one cellulose derivative in the presence of a water-soluble oxidation-curable resin (see U.S. patent application Ser. No. 210,576, filed Nov. 26, 1980). The emulsion composition obtained by this method can give a coated film having a tack-free surface of good feel and excellent properties such as excellent polishability, gloss and gasoline resistance, but when it is used as a lacquer, the transparency and surface gloss of the resulting coated film are not entirely satisfactory. Accordingly, it still leaves room for improvement.

We have made extensive investigations in order to eliminate the above defect of an emulsion composition containing a cellulose derivative. These investigations have led to the discovery that a cellulose derivative-containing emulsion composition free from the above-mentioned defect of unsatisfactory transparency and surface gloss in a lacquer can be obtained without a substantial deterioration in other film properties by preparing a cellulose derivative-modified graft copolymer having a specified acid value derived from a cellulose derivative and an ethylenically unsaturated monomer, and emulsion-polymerizing an ethylenically unsaturated monomer in the presence of a water-solubilized product of the graft copolymer.

Thus, according to this invention, there is provided an emulsion composition containing a cellulose derivative, which is the product of emulsion polymerization of at least one ethylenically unsaturated monomer in the presence of a water-solubilized product of a cellulose derivative-modified vinyl copolymer having an acid value of from about 3 to about 150, said copolymer being obtained by copolymerizing a cellulose derivative with an ethylenically unsaturated monomeric component composed of an ethylenically unsaturated acid and another ethylenically unsaturated monomer.

The essential feature of the emulsion composition of this invention is that the water-solubilized product of the cellulose derivative-modified vinyl copolymer having an acid value of from about 3 to about 150 obtained by copolymerizing a cellulose derivative with an ethylenically unsaturated monomeric component composed of an ethylenically unsaturated acid and another ethylenically unsaturated monomer is used as a dispersion stabilizer.

The cellulose derivative-modified vinyl copolymer will be described below in detail.

CELLULOSE DERIVATIVE

To be suitable for use in the preparation of the vinyl copolymer, the cellulose derivative should have such a property that when the final emulsion composition is coated on a substrate and dried, there is formed a coated film which has a tack-free surface of good feel with other excellent properties including polishability. Cellulose derivatives which meet this requirement generally include ester-modified type and ether-modified type cellulose derivatives having a number average molecular weight of from about 3,000 to about 300,000, preferably from about 5,000 to about 150,000.

Typical examples of the ester-modified cellulose derivatives are nitrocellulose, cellulose acetate butyrate, cellulose acetate propionate, cellulose acetate phthalate, acetyl cellulose, cellulose propionate, cellulose butyrate, cellulose phosphate, and cellulose sulfate.

Typical examples of the ether-modified cellulose derivatives include methyl cellulose, ethyl cellulose, butyl cellulose, benzyl cellulose, carboxy methyl cellulose, carboxy ethyl cellulose, aminoethyl cellulose, hydroxyethyl cellulose, oxyethyl cellulose, hydroxypropyl cellulose, and hydroxypropyl methyl cellulose.

These cellulose derivatives may be used singly or in combination with each other.

An emulsion composition prepared by the aforesaid conventional method using cellulose acetate butyrate (to be referred to as "CAB") obtained by butyl-etherifying a partially acetylated product of cellulose cannot give a coated film having excellent surface gloss and transparency. According to this invention, however, a CAB-containing emulsion composition capable of forming a coated film having excellent surface gloss and transparency can be effectively prepared, and is especially preferred in view of the inherent good weatherability of CAB.

CAB is available in various degrees of acetylation in the range of generally 1 to 34% by weight, preferably 1 to 16% by weight, more preferably 1 to 7% by weight; butyl group contents in the range of generally 16 to 60% by weight, preferably 25 to 60% by weight, more preferably 40 to 60% by weight; and viscosities, measured by the method described in ASTM-D-1343-54T, in the range of generally 0.005 to 5 seconds, preferably 0.005 to 3 seconds, more preferably 0.005 to 1 second. Specifically, there are advantageously used products of Eastman Kodak Co., U.S.A. available under trade names EAB-171-2, EAB-381-2, EAB-531-1, EAB-551-0.2 and EAB-551-0.01 (wherein in the first-appearing three-figure numbers, the first two figures represent the butyl group content in weight percent and the last figure represents the number of hydroxyl groups, and the last number indicates the viscosity in seconds).

ETHYLENICALLY UNSATURATED ACID

The ethylenically unsaturated acid is used to introduce an acidic group into the resulting copolymer by graft-copolymerizing with the cellulose derivative. It includes compounds having at least one, preferably only one, radical-polymerizable ethylenically unsaturated bond ($>C=C<$) and at least one, preferably 1 or 2, acid functional groups such as carboxyl or sulfo groups, per molecule. Preferred examples are compounds of the following general formula

wherein $R_1$ represents a hydrogen atom, a lower alkyl group or a carboxyl group, $R_2$ represents a hydrogen atom, a lower alkyl group or a carboxymethyl group, and Y represents a carboxyl group, a sulfo group, a sulfomethyl group ($—CH_2SO_3H$) or a sulfophenyl group

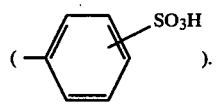

Specific examples of the ethylenically unsaturated acid include ethylenically unsaturated monocarboxylic acids having 3 to 10 carbon atoms, such as acrylic acid, methacrylic acid and crotonic acid; ethylenically unsaturated dicarboxylic acids having 4 to 12 carbon atoms, such as maleic acid, fumaric acid, an itaconic acid, or their monoalkyl ($C_{1-8}$) esters; and ethylenically unsaturated monosulfonic acids such as allylsulfonic acid, styrenesulfonic acid and α-methylstyrenesulfonic acid. Acrylic acid and methacrylic acid are especially preferred.

The term "lower", as used in the present specification and the appended claims, means that groups or compounds qualified by this term have not more than 6, preferably not more than 4, carbon atoms.

These ethylenically unsaturated acids can be used either singly or in combination.

OTHER ETHYLENICALLY UNSATURATED MONOMER

The other ethylenically unsaturated monomer which can be copolymerized with the cellulose derivative together with the aforesaid ethylenically unsaturated acid includes aliphatic, cyclic, or heterocyclic compounds, or mixtures thereof, which contain at least 1, preferably 1 or 2, radical polymerizable ethylenically unsaturated bonds per molecule and usually 2 to 26, preferably 3 to 21, carbon atoms and have a relatively low molecular weight. Specific examples are given below.

(A) Acrylic or methacrylic acid esters $C_{1-18}$ alkyl or cycloalkyl esters of acrylic or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; $C_{2-12}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_{2-8}$ hydroxyalkyl esters of acrylic or methacrylic acid such as hydroxyethyl acrylate, hydroxyethyl methacrylate, hydroxyethyl methacrylate, hydroxypropyl acrylate and hydroxypropyl methacrylate; monoesters of acrylic or methacrylic acid with (poly) $C_{1-12}$ alkylene glycols, such as ethylene glycol, polyethylene glycol, propylene glycol, polypropylene glycol or butylene glycol, or their $C_{1-12}$ alkyl ethers; glycidyl acrylate, glycidyl methacrylate or adducts formed between glycidyl acrylate or methacrylate with $C_{2-18}$ saturated or unsaturated monocarboxylic acids (e.g., acetic acid, propionic acid, stearic acid, linoleic acid, lauric acid, oleic acid, or linolenic acid); and condensation products formed between $C_{2-18}$ saturated or unsaturated monocarboxylic acids and $C_{1-4}$ hydroxyalkyl esters of acrylic or methacrylic acid such as hydroxyethyl methacrylate, hydroxyethyl acrylate, hydroxypropyl acrylate or hydroxypropyl methacrylate.

(B) Vinyl aromatic compounds

Styrene, α-methylstyrene, vinyltoluene, p-chlorostyrene, and vinylpyridine.

(C) Diolefinic compounds

Diolefins having 4 to 5 carbon atoms, such as butadiene, isoprene, and chloroprene.

(D) Monolefinic compounds $C_{2-8}$ monolefins such as ethylene, propylene and butene.

(E) Acrylic or methacrylic amide

Acrylamide, methacrylamide, N-methylol acrylamide, and N-butoxymethyl acrylamide.

(F) Ethylenically unsaturated nitriles

Acrylonitrile and methacrylonitrile.

(G) Vinyl esters of carboxylic acids

Vinyl acetate, vinyl propionate, and Veova monomer (a trademark for a product of Shell Chemical Co.).

(H) Other ethylenically unsaturated monomers

Methylisopropenyl ketone, vinyl chloride, vinylidene chloride, and di($C_{1-8}$ alkyl) esters of maleic acid.

Among these ethylenically unsaturated monomers, acrylic or methacrylic acid esters are especially preferred for use in this invention.

The above ethylenically unsaturated monomers may be used singly or in a combination of two or more.

For preparation of a stable emulsion, it is preferred to use a polyfunctional unsaturated monomer together with the ethylenically unsaturated monomers. The amount of the polyfunctional unsaturated monomer is not more than 30% by weight, preferably not more than 7% by weight, based on the total amount of the ethylenically unsaturated monomeric component, and should be one in which no gellation occurs. The term "polyfunctional unsaturated monomer", as used herein, denotes a monomer containing in the molecule one radical-polymerizable unsaturated group and at least one graft-polymerizable unsaturated group which is not directly resonant with the radical-polymerizable unsaturated group.

Examples of the polyfunctional compound include compounds having an allyl group, such as esters of acrylic or methacrylic acid with allyl alcohol; and esters formed between alicyclic carboxylic acids containing a polymerizable double bond in the ring such as tetrahydrophthalic anhydride or 3,6-endomethylene tetrahydrophthalic anhydride and hydroxyl-containing acrylic monomers, for example, $C_{1-8}$ hydroxyalkyl esters of acrylic or methacrylic acid such as hydroxyethyl acrylate, hydroxyethyl methacrylate, hydroxypropyl acrylate, or hydroxypropyl methacrylate, or glycidyl esters of acrylic or methacrylic acid such as glycidyl acrylate or glycidyl methacrylate. If such a polyfunctional unsaturated monomer is used conjointly, a graft-reactive unsaturated bond remains in the resulting cellulose derivative-modified vinyl copolymer. Accordingly, grafting reaction takes place between this graft-reactive unsaturated bond and the ethylenically unsaturated monomeric component during emulsion-polymerization to be subsequently carried out. This results in a stable emulsion composition which gives a coated film having particularly superior surface gloss.

PREPARATION OF THE CELLULOSE DERIVATIVE-MODIFIED VINYL COPOLYMER

The copolymerization of the cellulose derivative and the ethylenically unsaturated monomeric component composed of at least one ethylenically unsaturated acid and at least one other ethylenically unsaturated monomer is carried out generally in the presence of a radical polymerization initiator in accordance with an ordinary emulsion polymerization method. As a result, there is obtained a cellulose derivative-modified vinyl copolymer in which a water-soluble resin composed of a copolymer of the aforesaid ethylenically unsaturated monomeric component is grafted to a trunk of the cellulose derivative. The ratio of the cellulose derivative to the ethylenically unsaturated monomeric component in the emulsion polymerization can be varied over a wide range depending upon the type of the monomeric component used. Generally, the weight ratio of the cellulose derivative to the ethylenically unsaturated monomeric component can be from 1:0.1 to 1:10, preferably from 1:0.3 to 1:3. If the amount of the ethylenically unsaturated monomeric component is less than the above specified limit, water-solubilization of the resulting cellulose derivative-modified vinyl copolymer is difficult. On the other hand, if it is larger than the specified limit, the properties of the cellulose derivative tends to be difficult to utilize.

The amount of the ethylenically unsaturated acid used as an essential ingredient in the ethylenically unsaturated monomeric component in order to render the resulting cellulose derivative-modified vinyl copolymer water-soluble is such that the theoretical acid value of the cellulose derivative-modified vinyl copolymer is about 3 to about 150, preferably about 10 to about 100.

The "theoretical acid value", as used herein, denotes the acid value of the cellulose derivative-modified vinyl copolymer which would be obtained if 100% of the added ethylenically unsaturated acid were reacted.

The cellulose derivative-modified vinyl copolymer formed by the copolymerization of the individual components described above is especially suitable when at least 50% by weight of the water-soluble resin portion grafted to the trunk of the cellulose derivative consists of an acrylic or methacrylic ester, and the solubility parameter (to be abbreviated SP) of the water-soluble resin portion is 8.0 to 10.5, preferably 9.5 to 10.0. Desirably, the types and amounts of the ethylenically unsaturated monomers are selected so as to satisfy these conditions.

SP generally denotes the square root of cohesive energy per unit volume (cohesive energy density, cal/cc), i.e. the energy required to spearate one molecule away from a group of molecules, as a condition for dispersing solute molecules in solvent molecules in a dissolving phenomenon of a solute-solvent system. Let the molar heat of evaporation be $\Delta E$, the molar volume, V, and SP, $\delta$, then the cohesive energy density is given by $\Delta E/V$, and $\delta$ is given by $(\Delta E/V)^{\frac{1}{2}}$ [unit: $(cal/cc)^{\frac{1}{2}}$].

Let the weight fractions of the ethylenically unsaturated acid and the ethylenically unsaturated monomers A, B, C ... be Wa, Wb, Wc ... and their SP values, $\delta a$, $\delta b$, $\delta c$ ..., the SP value $\delta$ of the water-soluble resin is given by the following equation.

$$\delta = \frac{\delta a Wa + \delta b Wb + \delta c Wc + \ldots}{Wa + Wb + Wc + \ldots}$$

The SP values of the ethylenically unsaturated monomers used here are those described at pages 76 to 118 of Journal of Paint Technology, Vol. 42, No. 541 (1970).

Suitable solvents which can be used in the above solution-polymerization method are water-miscible organic solvents, such as alcohols, Cellosolve solvents, carbitols, ethers and diglymes. A film-forming aid, a plasticizer, etc. may also be used. These materials may be used singly or in combination.

The polymerization temperature is generally about 50° to about 200° C., preferably about 80° to about 150° C.

Any initiators capable of generating radicals can generally be used as initiators for radical polymerization in accordance with this invention. Examples of suitable initiators are organic peroxides such as benzoyl peroxide and lauroyl peroxide; peroxides such as dicumyl peroxide; and hydroperoxides such as tert-butyl hydroperoxide and cumene hydroperoxide. Ketone peroxides and peresters can also be used. Instead of using such a radical polymerization initiator, the polymerization may preferably be initiated by ionizing radiation.

It is generally believed that in the copolymerization in accordance with this invention using an organic peroxide as a polymerization initiator, free radicals generated by the heat decomposition of the organic peroxide initiator induce so-called chain transfer in the cellulose derivative, and by free radicals generated on the cellulose derivative, the polymerization of the ethylenically unsaturated monomers is initiated, and that the ethylenically unsaturated monomers grow as branches from the cellulose derivative, thereby forming a graft copolymer. Hence, the use of an organic peroxide initiator is advantageous. Polymerization initiators which do not have a hydrogen extracting action by themselves may also be used since a graft reaction by the chain transfer of monomer radicals can occur.

Desirably, substantially all of the cellulose derivative used copolymerizes with the ethylenically unsaturated monomeric component. There is no trouble, however, even if a minor portion of the cellulose derivative remains unreacted in the resulting copolymer.

The cellulose derivative-modified vinyl copolymer so prepared has a theoretical acid value of about 3 to about 150, preferably about 10 to about 100.

The resulting cellulose derivative-modified vinyl copolymer can be used as a dispersion stabilizer in accordance with this invention after it is neutralized with a known neutralizing agent, preferably a volatile amine, ammonia, or alkali metal hydroxide and if required, water-solubilized by using a water-soluble organic solvent such as a Cellosolve solvent or an alcoholic solvent. This water solubilization can be carried out at any stage before, during or after the addition of the ethylenically unsaturated monomers to be emulsion-polymerized and before the starting of the emulsion polymerization.

According to this invention, at least one ethylenically unsaturated monomer is emulsion-polymerized in the presence of the water-solubilized cellulose derivative-modified vinyl copolymer.

The ethylenically unsaturated monomer to be emulsion-polymerized is a relatively low-molecular-weight compound having at least one, preferably one or two, radical-polymerizable ethylenically unsaturated bond, and can be selected from the ethylenically unsaturated acids and other ethylenically unsaturated monomers described hereinabove with respect to the preparation of the cellulose derivative-modified vinyl copolymer, depending upon the properties desired of the final emulsion composition. Among such compounds, the aforesaid acrylic or methacrylic esters having good compatibility with the cellulose derivative-modified vinyl copolymer are preferred. The effect of improving the surface gloss and transparency of the coated film on the basis of the aforesaid compatibility becomes greater if the types and amounts of the ethylenically unsaturated monomers to be emulsion-polymerized are adjusted such that at least 50% of the entire unsaturated monomers consists of such an acrylic or methacrylic ester and a copolymer obtained by emulsion-polymerization of these monomers has an SP value of 7.5 to 10.0, preferably 8.0 to 9.5.

The emulsion-polymerization can be carried out by methods known per se. For example, it is carried out in the presence of the aforesaid dispersion stabilizer, if required in the further presence of a polymerization initiator (e.g., an azo compound, a peroxide compound, a diazo compound, a nitroso compound, a sulfide, or a redox system) or by using an ionizing radiation such as $\gamma$-ray, with or without stirring, at a temperature above the freezing point of the reaction medium but not exceeding the boiling point of water, usually at room temperature.

As an aqueous medium used as the reaction medium for the above polymerization, there can be used water and a mixture of water and a water-miscible organic solvent such as organic solvents of the alcohol, Cellosolve, carbitol, ether, diglyme and glycol types.

Generally, it is advantageous that the amount of the ethylenically unsaturated monomer to be emulsion-polymerized is 0.05 to 10 times (as solids), preferably 0.1 to 3 times, the weight of the cellulose derivative-modified vinyl copolymer as a dispersion stabilizer.

The cellulose derivative-modified emulsion composition of this invention generally contains 20 to 50% by weight of solids and has excellent stability. Coated films prepared from the emulsion composition have excellent transparency and gloss, may also have high hardness. The coated films are compact in texture, and also have excellent polishability, water resistance, gasoline resistance, etc.

The emulsion composition of this invention can be formed into lacquers by adding a pigment, an antifoamer, a thickener, etc. as required, and the lacquers can be used for household purposes, making wooden products, and repairing automotive bodies and parts.

The following examples illustrate the present invention further. All percentages in these examples are by weight unless otherwise specified.

EXAMPLE 1

A mixture of 200 g of cellulose acetate butyrate (EAB 551-0.2, a trademark for a product of Eastman Kodak Co.) and 200 g of butyl Cellosolve was put in a 2-liter four-necked flask, and heated to 150° C. After confirming that the contents of the flask completely dissolved, the temperature of the contents was lowered to 130° C. A mixed solution consisting of 3 g of allyl methacrylate, 67 g of methyl methacrylate, 109 g of isobutyl methacrylate, 22 g of acrylic acid and 3 g of benzoyl peroxide was added dropwise over 40 minutes. After the addition, the contents of the flask were maintained at 130° C. for 3 hours, and thereafter cooled to 100° C. Then, 60 g of methyl methacrylate and 140 g of n-butyl methacrylate were added, followed by further adding 60 g of water and 30 ml of 29% aqueous ammonia. These ingredients were well dispersed, and a solution of 0.2 g of ammonium persulfate in 5 g of water was added. Thus, emulsion polymerization was carried out at 90° C. for 3 hours. As a result, a CAB-containing emulsion composition having a solids content of 42.1% and a viscosity of 14,000 centiposes (at 25° C.; measured at the same temperature hereinafter) was obtained in which the particles had a fine diameter and were stable.

The properties of a coated film prepared from the emulsion composition are shown in Table 1.

EXAMPLE 2

Cellulose acetate butyrate (200 g) and 200 g of butyl Cellosolve, same as used in Example 1, were put in a 2-liter four-necked flask, and heated to 150° C. After confirming that the contents of the flask completely dissolved, the temperature of the contents was lowered to 130° C. A mixed solution consisting of 3 g of allyl methacrylate, 57 g of methyl methacrylate, 109 g of isobutyl methacrylate, 32 g of acrylic acid and 3 g of benzoyl peroxide was added dropwise over 40 minutes. After the addition, the contents were maintained at 130° C. for 3 hours, and then cooled to 100° C.

Then, 60 g of methyl methacrylate and 140 g of n-butyl methacrylate were added, followed by further addition of 600 g of water and 30 ml of 29% aqueous ammonia. These ingredients were dispersed well, and a solution of 0.2 g of ammonium persulfate in 5 g of water was added. Thus, emulsion polymerization was carried out at 90° C. for 3 hours. As a result, a CAB-containing emulsion composition having a solids content of 41.4% and a viscosity of 4,200 centipoises was obtained in which the particles had a fine diameter and were stable.

The properties of a coated film prepared from the resulting emulsion composition are shown in Table 1.

EXAMPLE 3

A CAB-containing emulsion composition having a solids content of 41.0% and a viscosity of 6,600 centipoises was prepared in the same way as in Example 2 except that 59 g of methyl methacrylate was used instead of 3 g of allyl methacrylate and 57 g of methyl methacrylate used in the preparation of the CAB-modified vinyl copolymer.

The properties of a coated film prepared from the resulting emulsion composition are shown in Table 1.

EXAMPLE 4

A 2-liter four-necked flask was charged with 200 g of the same cellulose acetate butyrate as used in Example 1, 120 g of CS-12 [a tradename for a product of Chisso Company; represented by the following formula

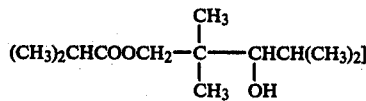

and 60 g of ethyl Cellosolve, and they were heated to 150° C. After confirming that the contents were completed dissolved, the temperature of the contents was lowered to 130° C., and a mixed solution consisting of 1 g allyl methacrylate, 73 g of methyl methacrylate, 94 g of isobutyl methacrylate, 32 g of acrylic acid and 3 g of benzoyl peroxide was added dropwise over 40 minutes. After the addition, the contents were maintained at 130° C. for 3 hours, and cooled at 100° C.

Then, 60 g of methyl methacrylate and 140 g of n-butyl methacrylate were added, followed by further adding 670 g of water and 30 ml of 29% aqueous ammonia. These ingredients were well dispersed, and a solution of 0.2 g of ammonium persulfate in 5 g of water was added. Thus, emulsion polymerization was carried out at 90° C. for 3 hours. As a result, a viscous CAB-containing emulsion composition was obtained in which the particles had a fine diameter and excellent stability. When the composition was diluted with water to a solids content of 35%, its viscosity was 7,400 centipoises.

The properties of a coated film prepared from the resulting composition are shown in Table 1.

EXAMPLE 5

A CAB-containing emulsion composition having a solids content of 39.5% and a viscosity of 6,400 centipoises was obtained in the same way as in Example 2 except that 60 g of methyl methacrylate, 100 g of n-butyl methacrylate and 40 g of styrene were used as monomers to be emulsion-polymerized.

The properties of coated film prepared from the resulting emulsion composition are shown in Table 1.

EXAMPLE 6

A CAB-containing emulsion composition having a solids content of 41.7% and a viscosity of 680 centipoises was prepared in the same way as in Example 1 except that 2 g of allyl methacrylate, 67 g of ethyl acrylate, 99 g of t-butyl methacrylate, 32 g of acrylic acid and 3 g of benzoyl peroxide were used as the ethylenically unsaturated monomers to be grafted to CAB.

The properties of a coated film prepared from the resulting emulsion composition are shown in Table 1.

EXAMPLE 7

A CAB-containing emulsion composition having a solids content of 42.4% and a viscosity of 2,000 centipoises was prepared in the same way as in Example 1 except that EAB 381-0.5 (a trademark for a product of Eastman Kodak Co.) was used instead of the cellulose acetate butyrate, and 2 g of allyl methacrylate, 57 g of methyl methacrylate, 109 g of isobutyl methacrylate, 32 g of acrylic acid and 3 g of benzoyl peroxide were used as the ethylenically unsaturated monomers to be graft-polymerized with EAB 381-0.5.

The properties of a coated film prepared from the resulting emulsion composition are shown in Table 1.

TABLE 1

| Example | Variations of hardness with time | | | | Gloss | Water resistance | Transparency | Stability of the emulsion composition |
| | 5 hours | 1 day | 3 days | 7 days | | | | |
| --- | --- | --- | --- | --- | --- | --- | --- | --- |
| 1 | 3B | B | F | H | 145 | No change | Yes | Good |
| 2 | 3B | F | F | H | 148 | No change | Yes | Good |
| 3 | 3B | HB | F | H | 113 | No change | Yes | Good |
| 4 | 4B | 2B | B | B | 136 | No change | Yes | Good |
| 5 | 2B | F | F | H | 117 | No change | Slightly cloudy | Good |
| 6 | 4B | F | F | F | 134 | No change | Yes | Good |
| 7 | 3B | F | F | F | 100 | No change | Slightly cloudy | Good |

Testing methods

Hardness:

The pencil hardness of a coated film on a glass plate was measured after drying the coating for 5 hours, 1 day, 3 days and 7 days.

Gloss:

The 20° specular gloss of a coated film on a glass plate was measured.

Water resistance:

A water drop was placed on the surface of a coating applied to a surface-treated steel plate and dried for 7 days, and the coating was observed two hours later to determine changes.

Transparency:

A coated film on a glass plate was visually observed.

Stability of the emulsion:

The emulsion composition was left to stand for 30 days, and then observed visually.

What we claim is:

1. A cellulose derivative-containing emulsion composition which is the product of emulsion polymerization of (A) at least one ethylenically unsaturated monomer in the presence of (B) a water-solubilized product of a cellulose derivative-modified vinyl copolymer having an acid value of from about 3 to about 150, said vinyl copolymer being obtained by graft-copolymerizing (1) an ethylenically unsaturated monomeric component composed of an ethylenically unsaturated acid (1-a) and another ethylenically unsaturated monomer (1-b) onto (2) a cellulose derivative.

2. A composition of claim 1 wherein said cellulose derivative is an ester-modified or ether-modified cellulose derivative having a number average molecular weight of about 3,000 to about 300,000.

3. A composition of claim 2 wherein the ester-modified cellulose derivative is selected from the group consisting of nitrocellulose, cellulose acetate butyrate, cellulose acetate propionate, cellulose acetate phthalate, cellulose acetate, cellulose propionate, cellulose butyrate, cellulose phosphate, and cellulose sulfate.

4. A composition of claim 2 wherein the ether-modified cellulose derivative is selected from the group consisting of methyl cellulose, ethyl cellulose, butyl cellulose, benzyl cellulose, carboxy methyl cellulose, carboxy ethyl cellulose, aminoethyl cellulose, hydroxyethyl cellulose, oxyethyl cellulose, hydroxypropyl cellulose, and hydroxypropyl methyl cellulose.

5. A composition of claim 1 wherein the cellulose derivative is cellulose acetate butyrate.

6. A composition of claim 1 wherein the ethylenically unsaturated acid is a compound having one radical-polymerizable ethylenically unsaturated bond and one or two carboxyl or sulfo groups in the molecule.

7. A composition of claim 1 wherein the ethylenically unsaturated acid is a compound of the following general formula

wherein $R_1$ represents a hydrogen atom, a lower alkyl group or a carboxyl group, $R_2$ represents a hydrogen atom, a lower alkyl group or a carboxymethyl group, and Y represents a carboxyl, sulfo, sulfomethyl ($-CH_2SO_3H$) or sulfophenyl

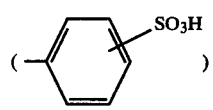

group.

8. A composition of claim 7 wherein the ethylenically unsaturated acid is selected from the group consisting of ethylenically unsaturated monocarboxylic acids having 3 to 10 carbon atoms, ethylenically unsaturated dicarboxylic acids having 4 to 12 carbon atoms, mono($C_{1-8}$ alkyl) esters of said unsaturated dicarboxylic acids, allylsulfonic acid, styrenesulfonic acid and α-methylstyrenesulfonic acid.

9. A composition of claim 1 wherein the ethylenically unsaturated acid is selected from acrylic acid, methacrylic acid, crotonic acid, maleic acid, fumaric acid, itaconic acid, allylsulfonic acid and styrenesulfonic acid.

10. A composition of claim 1 wherein the ethylenically unsaturated acid is acrylic acid.

11. A composition of claim 1 wherein the other ethylenically unsaturated monomer is selected from acrylic acid esters, methacrylic acid esters, vinyl aromatic compounds, diolefins, monolefins, acrylic acid amides, methacrylic acid amides, ethylenically unsaturated nitriles and vinyl esters of carboxylic acids.

12. A composition of claim 1 wherein the other ethylenically unsaturated monomer is selected from $C_{1-18}$ alkyl or cycloalkyl acrylates and methacrylates, $C_{2-12}$ alkoxyalkyl acrylates and methacrylates, $C_{2-8}$ hydroxyalkyl acrylates and methacrylates, monoesters between (poly) $C_{1-12}$ alkylene glycols or their mono-$C_{1-12}$ alkyl ethers and acrylic or methacrylic acid, glycidyl acrylate, glycidyl methacrylate, adducts of glycidyl acrylate or methacrylate with saturated or unsaturated monocarboxylic acids having 2 to 18 carbon atoms, and condensates formed between $C_{1-4}$ hydroxyalkyl acrylates or methacrylates and $C_{2-18}$ saturated or unsaturated monocarboxylic acids.

13. A composition of claim 1 wherein the ethylenically unsaturated monomeric component contains at least 50% by weight of an acrylic or methacrylic acid ester.

14. A composition of claim 1 wherein the ethylenically unsaturated monomeric component (1) further comprises not more than 30% by weight, based on the total weight of the ethylenically unsaturated acid (1-a) and the other ethylenically unsaturated monomer (1-b), of a polyfunctional unsaturated monomer (1-c).

15. A composition of claim 14 wherein the polyfunctional unsaturated monomer (1-c) is selected from ester of acrylic or methacrylic acid with allyl alcohol, and esters of tetrahydrophthalic anhydride or 3,6-endomethylene tetrahydrophthalic anhydride with $C_{1-8}$ hydroxyalkyl acrylates or methacrylates or glycidyl acrylate or methacrylate.

16. A composition of claim 1 wherein in the preparation of the cellulose derivative-modified vinyl copolymer, the weight ratio of the cellulose derivative to the ethylenically unsaturated monomeric component is in the range of from 1:0.1 to 1:10.

17. A composition of claim 1 wherein the ethylenically unsaturated acid is used in such an amount that the resulting cellulose derivative-modified vinyl copolymer has a theoretical acid value of about 3 to about 150.

18. A composition of claim 1 wherein said at least one ethylenically unsaturated monomer to be emulsion-polymerized comprises at least 50% by weight, based on its total weight, of an acrylic or methacrylic ester.

19. A composition of claim 18 wherein the acrylic or methacrylic ester is selected from $C_{1-18}$ alkyl or cycloalkyl acrylates and methacrylates, $C_{2-12}$ alkoxyalkyl acrylates and methacrylates, $C_{2-8}$ hydroxyalkyl acrylates and methacrylates, monoesters between (poly) $C_{1-12}$ alkylene glycols or their mono-$C_{1-12}$ alkyl ethers and acrylic or methacrylic acid, glycidyl acrylate, glycidyl methacrylate, adducts of glycidyl acrylate or methacrylate with saturated or unsaturated monocarboxylic acids having 2 to 18 carbon atoms, and condensates formed between $C_{1-4}$ hydroxyalkyl acrylates or methacrylates and $C_{2-18}$ saturated or unsaturated monocarboxylic acids.

20. A composition of claim 1 wherein the amount of said at least one ethylenically unsaturated monomer (a) used is 0.05 to 10 times the weight of the cellulose derivative-modified vinyl copolymer (B), as solids content.

21. A composition of claim 1 which has a solids content of 20 to 50% by weight.

22. A composition of claim 17 wherein the theoretical acid value is about 10 to about 100.

* * * * *